(12) United States Patent
Garant

(10) Patent No.: US 11,878,406 B2
(45) Date of Patent: Jan. 23, 2024

(54) HOLDER FOR A BIT OF A TOOL

(71) Applicant: Royal Machine Solutions Inc., Brantford (CA)

(72) Inventor: Michael Garant, Brantford (CA)

(73) Assignee: Royal Machine Solutions Inc., Brantford (CA)

( * ) Notice: Subject to any disclaimer, the term of this patent is extended or adjusted under 35 U.S.C. 154(b) by 719 days.

(21) Appl. No.: 16/936,003

(22) Filed: Jul. 22, 2020

(65) Prior Publication Data

US 2022/0024024 A1 Jan. 27, 2022

(51) Int. Cl.
*B25H 3/00* (2006.01)
*B25F 5/02* (2006.01)
*F16B 45/02* (2006.01)

(52) U.S. Cl.
CPC ............... *B25H 3/003* (2013.01); *B25F 5/02* (2013.01); *F16B 45/02* (2013.01)

(58) Field of Classification Search
CPC .......... B25H 3/003; B25H 3/006; B25F 5/02; Y10T 24/1397; A45F 2200/0575; A45F 2200/0566
See application file for complete search history.

(56) References Cited

U.S. PATENT DOCUMENTS

| | | | |
|---|---|---|---|
| 4,997,194 A * | 3/1991 | Krohn | B25B 33/005 81/16 |
| 10,195,733 B2 | 2/2019 | Jannitto, Jr. et al. | |
| 10,219,610 B1 | 3/2019 | Henkel | |
| 10,688,644 B2 | 6/2020 | Iida et al. | |
| 2016/0128455 A1* | 5/2016 | Moreau | B25H 3/00 24/3.13 |
| 2022/0250166 A1* | 8/2022 | Pineault | B25H 3/003 |
| 2022/0288769 A1* | 9/2022 | Zolno | B25H 3/003 |

FOREIGN PATENT DOCUMENTS

| | | |
|---|---|---|
| CA | 2061591 | 8/1992 |
| CA | 2257065 | 8/1997 |
| CA | 2346458 | 4/2000 |
| CA | 2408711 | 4/2003 |
| CA | 2585725 | 10/2007 |
| CA | 2892957 | 1/2013 |
| CA | 2810878 | 9/2013 |
| CA | 2877912 | 1/2014 |
| CA | 2878179 | 1/2014 |
| CA | 2982328 | 10/2016 |
| CA | 3042017 | 5/2017 |
| CA | 3014602 | 9/2018 |
| CA | 2970486 | 12/2018 |

* cited by examiner

*Primary Examiner* — Robert Sandy
(74) *Attorney, Agent, or Firm* — Gardiner Roberts LLP

(57) ABSTRACT

A holder for a bit for a tool is provided. The holder comprises: a bearing shaped to securely hold the bit; and a housing attached to the bearing and to a clip. In the holder, when the housing is attached to the clip, the bit may be mounted to the tool and the tool may be operated to rotate the bit; and when the bit is removed from the tool, the bit is still attached to the housing which is still attached to the clip. The housing may be shaped and sized to provide a friction fit to securely hold the outer ring. A cable may attach the housing to the clip.

20 Claims, 6 Drawing Sheets

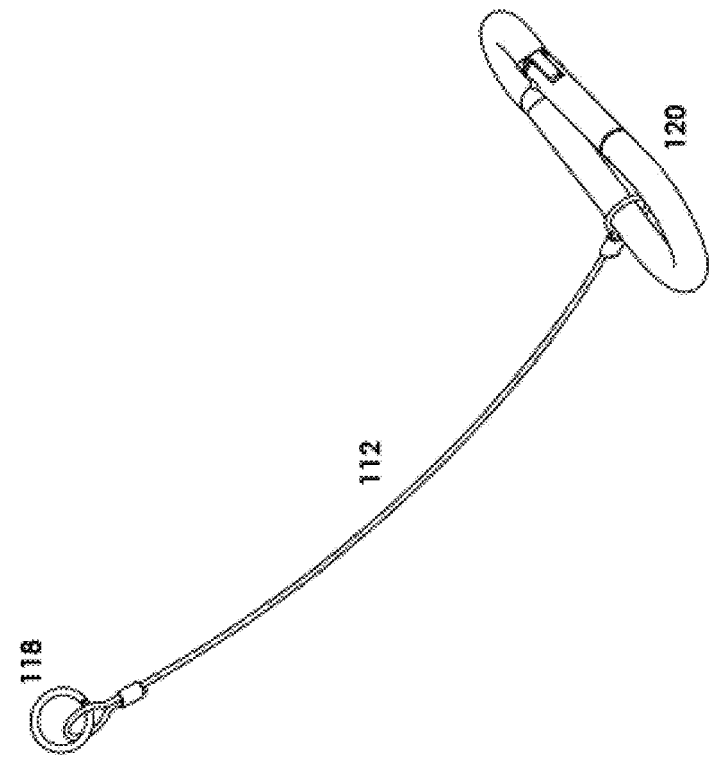
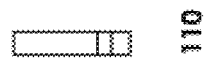
FIG. 5

HOLDER FOR A BIT OF A TOOL

FIELD OF DISCLOSURE

The present disclosure relates to an apparatus for holding a bit for a tool, such as an interchangeable tool bit for a power tool, such as a power drill.

BACKGROUND

Multi-bit screwdrivers and powered drills are examples of handheld and power tools that have replaceable bits. A tool with multiple bits provides expanded use over tools having a fixed bit, as each bit can be configured to provide a profile for different screws (e.g. a slot head, a Phillips head, a Robertson head, and any sizes of such heads) and/or different tools (e.g. pointed tips, saw blades, sockets, drill bits, etc.) and be interchanged with the tool. Unfortunately, in use, when a multi-bit tool is used, one or more of the bits is easily lost or misplaced, especially when a bit on the tool is changed for a different bit. There are also difficulties in keeping track of the different bits for the tool.

SUMMARY OF THE DISCLOSURE

In a first aspect, a holder for a bit for a tool is provided. The holder comprises: a bearing shaped to securely hold the bit; and a housing attached to the bearing and to a clip. In the holder, when the housing is attached to the clip, the bit may be mounted to the tool and the tool may be operated to rotate the bit; and when the bit is removed from the tool, the bit is still attached to the housing which is still attached to the clip.

For the holder, an inner ring of the bearing may be shaped and sized to provide a friction fit to securely hold the bit.

For the holder, the housing may be attached to an outer ring of the bearing.

For the holder, the housing may be shaped and sized to provide a friction fit to securely hold the outer ring.

For the holder, a cable may attach the housing to the clip. Alternatively, a ring may attach the housing to a cable attachable to the clip, the ring providing a break mechanism for the cable from the housing.

For the holder, an identifier may be provided on either the housing or the cable that identifies the bit.

For the holder, the clip may further comprise a connector attachable to the cable. The cable may be retractable into a cable housing.

For the holder, the clip may be attached to the tool. Alternatively, for the holder, the clip may be separate from the tool.

In a second aspect, a set of holders for bits for a tool is provided. The set comprises: a first holder for a first bit; a second holder for a second bit; and a clip. For the set, each holder comprises: a bearing shaped to securely hold its bit, and a housing attached to the bearing. For each holder, its housing is attachable to the clip and when its housing is attached to the clip, its bit can be mounted to the tool and the tool can be operated to rotate its bit; and when its bit is removed from the tool, its bit is still attached to the housing which is still attached to the clip.

For the set, each holder may have an identifier provided on either the housing or the cable that identifies its bit.

For the set, one or each bearing may have an inner ring of the bearing shaped and sized to provide a friction fit to securely hold its bit.

For the set, one or each holder may be attached to the clip by a cable.

For the set, the clip may further comprise a connector to attach the cable to the clip.

For the set, the clip may be attached to the tool.

In a third aspect, a holder for bits for a tool is provided. The holder comprises: a bit shaped to be mounted to the tool; a bearing shaped to securely hold the bit, the bearing having an inner ring and an outer ring; a housing attached to the outer ring of the bearing; a wire attached to the housing; and a clip attachable to the wire. For the holder, when the wire is attached to the clip, the bit may be mounted to the tool and the tool may be operated to rotate the bit; and when the bit is removed from the tool, the bit is still attached to the housing which is still attached to the clip.

The holder may further comprise an identifier provided on either the housing or the cable that identifies the bit.

For the holder the housing may be shaped and sized to provide a friction fit to securely hold the outer ring.

In other aspects, various combinations of sets and subsets of the above aspects are provided.

BRIEF DESCRIPTION OF THE DRAWINGS

Embodiments of the disclosure will now be described, by way of example only, with reference to the accompanying drawings, in which:

FIG. 5 is a plan exploded view illustrating components of the holder of FIG. 4.

DETAILED DESCRIPTION OF EMBODIMENTS

Figure 1:
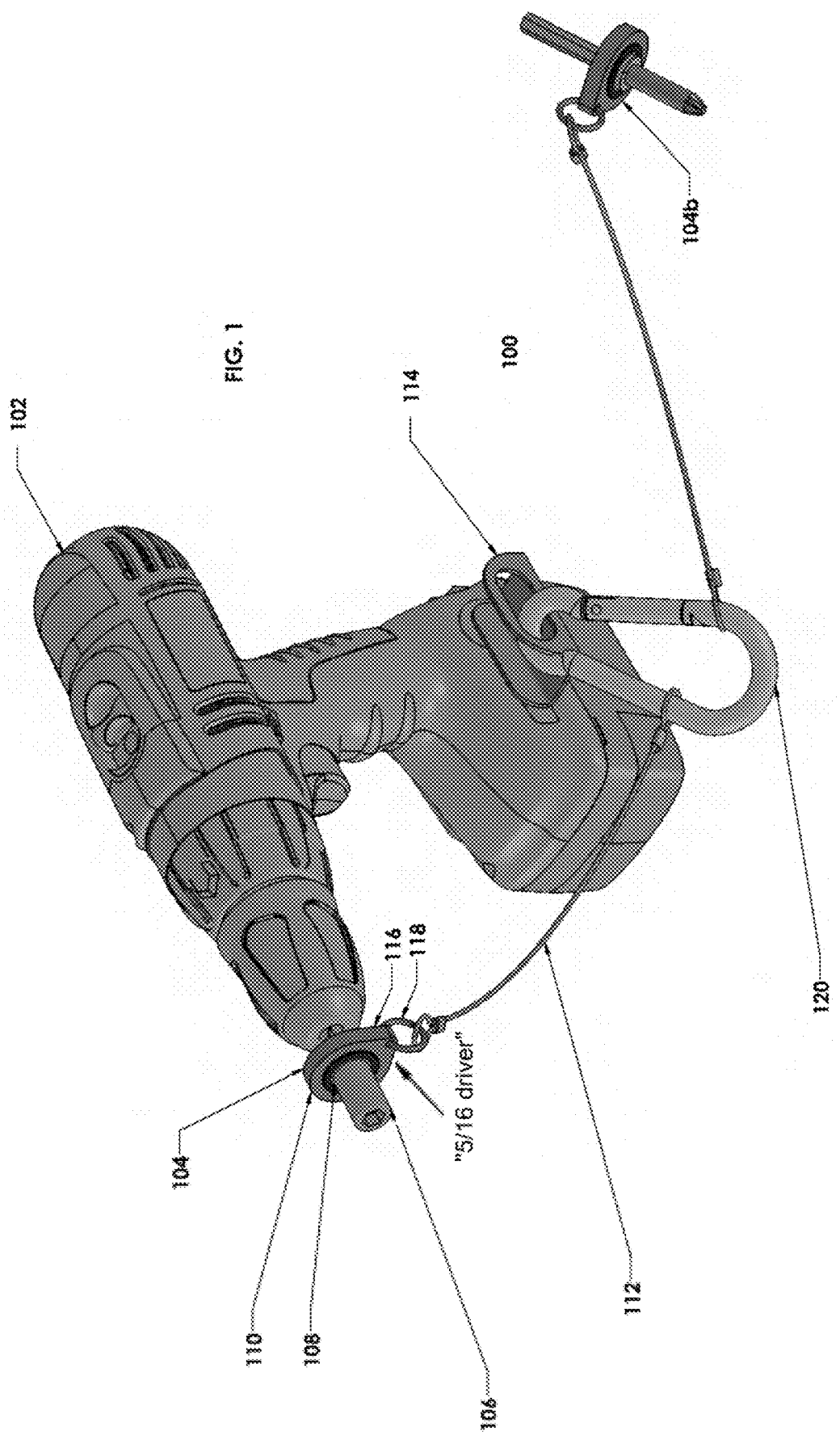
FIG. 1 is a perspective view illustrating an embodiment of holders for bits of a tool.
Figure 2:
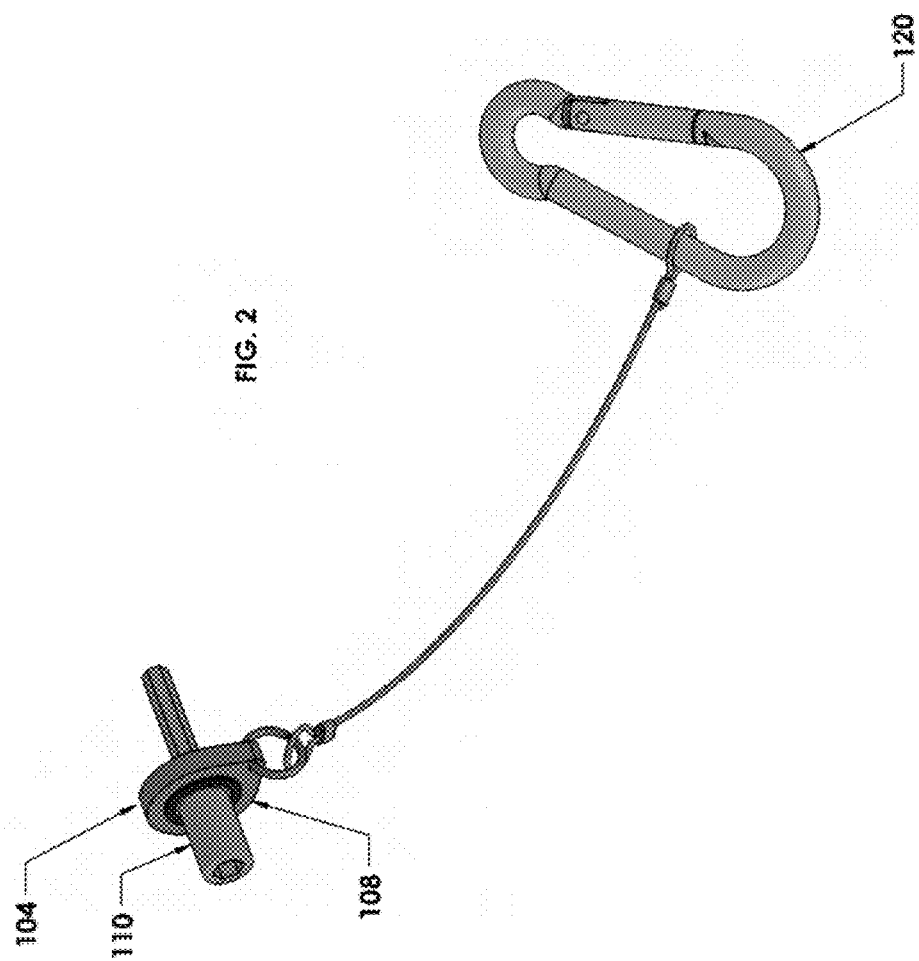
FIG. 2 is another perspective view illustrating features of one holder of FIG. 1 without the tool.
Figure 3:
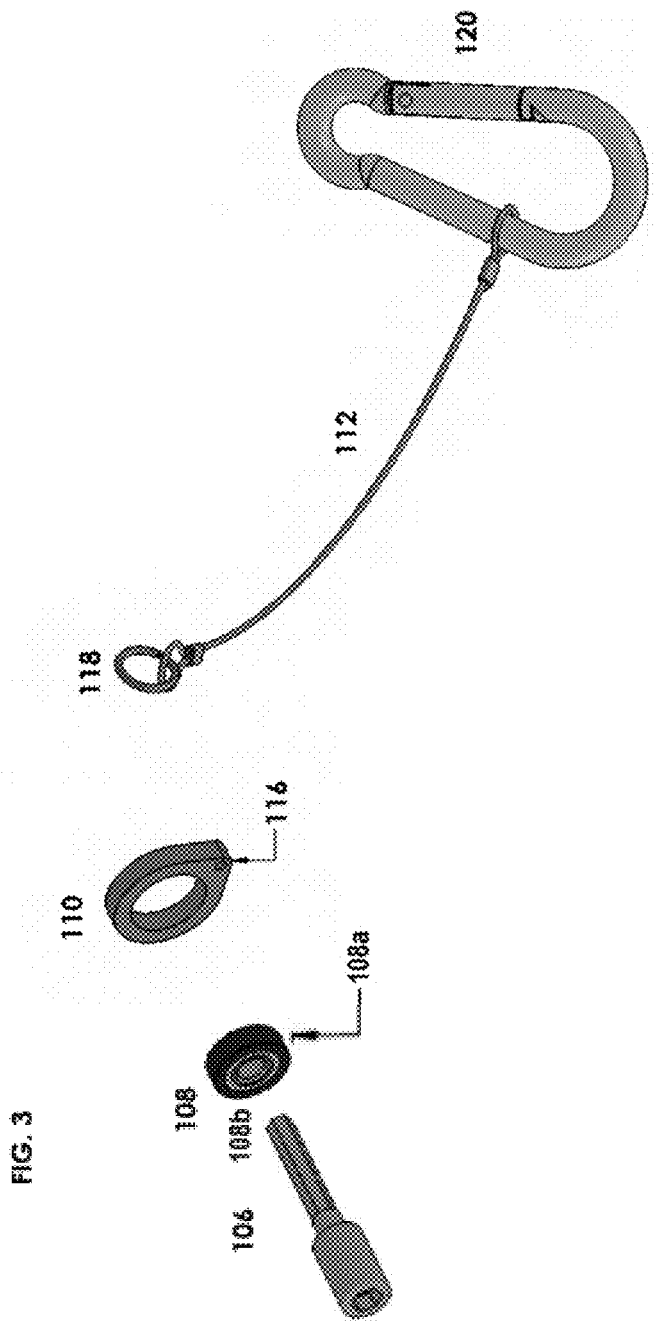
FIG. 3 is an exploded perspective view illustrating components of the holder of FIG. 2.
Figure 4:
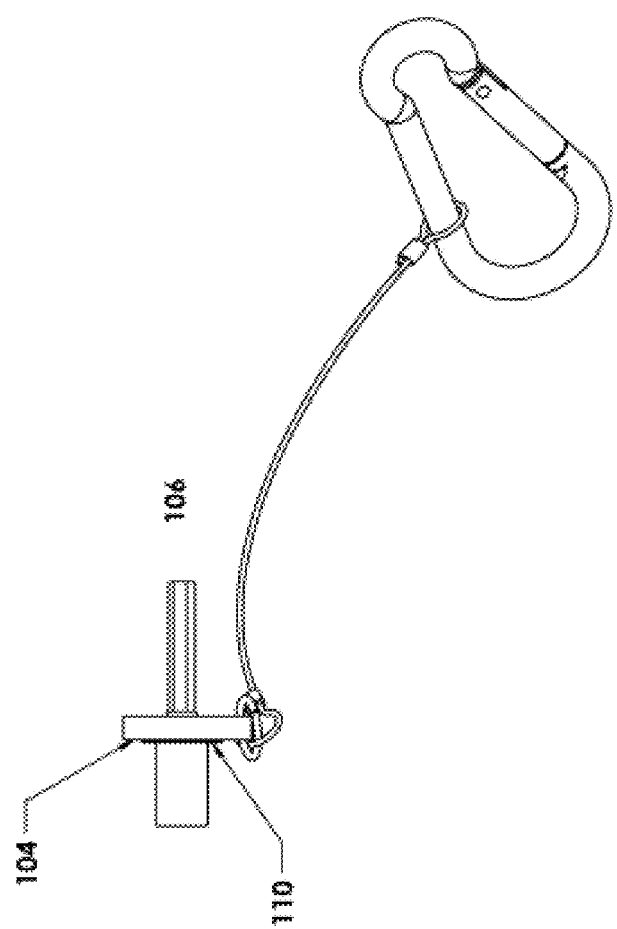
FIG. 4 is a plan view illustrating components of the holder of FIG. 2.
Figure 6:
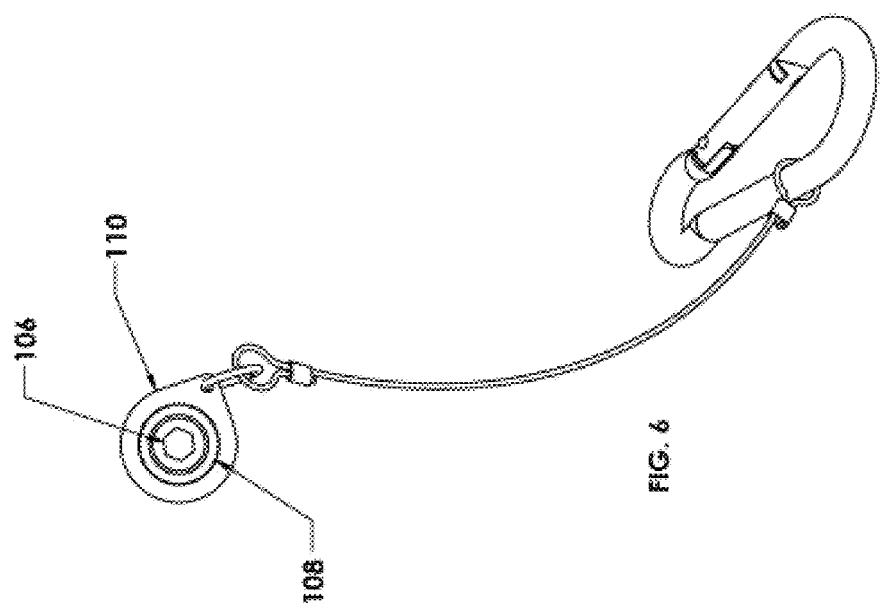
FIG. 6 is a top view illustrating components of the holder of FIG. 2.

The description which follows and the embodiments described therein are provided by way of illustration of examples of particular embodiments of the principles of the present disclosure. These examples are provided for the purposes of explanation and not limitation of those principles and of the disclosure. In the description which follows, like parts are marked throughout the specification and the drawings with the same respective reference numerals.

Aspects of embodiments are described with respect to a tool being used in situ where the tool is designed to accept different bits. A particular embodiment is for a handheld power drill, where multiple bits are provided. The shaft of each bit may be inserted and fixed to the drill's chuck.

To provide context for orientation and directional terms used herein, the term "longitudinal" used herein describes the direction along the major length of a tool or a bit (e.g. from front to back of the tool) and accordingly, the term "longitudinal", when used herein in association with an embodiment describes a direction along the major length of the embodiment (e.g. from front to back of the embodiment when aligned with the front to back of a bit). Correspondingly, the term "transverse" used herein describes a direction across the major length of a tool or bit (e.g. from left side to right side of the tool) and accordingly, the term "transverse", when used in association with an embodiment describes a direction across the major length of the embodiment (e.g. from the left side to the right side of the embodiment when the embodiment is aligned with the front to back of a tool). The terms "longitudinal" and "transverse" and other orientation terms will have inherent and clear directional meaning in view of their context and related text in the description.

Briefly, an aspect of embodiment provides a holder for a removable accessory for a tool, such as a bit, that holds the accessory while the accessory is mounted to the tool. The holder is mounted to the accessory and is designed to allow the normal operation of the tool with the accessory. Also, the holder is attachable to clip, via a cable attached to the holder. The other end of the cable may be attached to the clip. The clip may be attached to the tool. As such, in use, the accessory can be mounted to the tool and used. When the accessory is removed from the tool, the cable keeps the accessory attached to the clip, and allows the accessory to be quickly located (as opposed to being potentially misplaced if the accessory was loose and separate from the tool). As such, a second accessory with a second holder and cable can subsequently be mounted to the tool and used. As such the first and second accessories are both attachable to the tool, but each can independently be mounted to the tool.

One embodiment provides a bit that is attached to a holder. The holder has a bearing incorporated therein. The bearing permits the bit to be rotated within the holder. The holder is attached to a cable and the cable may be attached to the drill. In operation, a user of the drill would insert the shank of the bit into the chuck of the drill, as typically done. The holder is attached along the shaft of the bit in a spaced relationship to the chuck. The holder may spin about the central axis of the bit. The embodiment permits rotation of the bit while in the tool and maintains and the holder is still connected to the bit. It will be appreciated that a bearing permits the rotation of the bit in the tool while isolating the holder from the rotational forces imparted by the tool. The term "bearing" is used herein includes all types, forms, sizes and builds of bearing, including, without limitation, ball bearings, hex bearings, swivel bearings, and bearings without balls. It will be appreciated that aside from a bearing, other isolating interfaces may be used, such as bushings (made from any suitable material, such as plastic or brass) or custom formed components providing comparable rotational freedom for the bit while isolating the holder from the rotational forces. The term "bearing" as used herein globally includes such other isolating interfaces.

Referring to FIGS. 1 to 6, aspects of an embodiment of a holder for a bit for a tool are shown. For brevity, the term "tool" will be understood to include any tool or implement, powered or not; the term "bit" will be understood to be any mountable accessory for the tool. A tool may be connectable to multiple bits, generally one bit at a time. In FIG. 1, shown generally at 100 are tool 102, bit holder 104 for bit 106, and second bit holder 104b for another bit. For the shown embodiment, tool 102 is a standard power drill with a chuck that accepts different drill bits. Bit 106 is shown as a 5/16 inch nut driver, having a hexagonal cross-section shape. An embodiment provides holders for different bits to be easily inserted and extracted from a tool and also provide a tether to the bits, to assist from losing or misplacing the bits.

Bit holder 104 comprises bearing 108 and cable attachment housing 110 mounted around bearing 108. In one embodiment, bearing 108 is a commercially available bearing, such as a bearing commonly used on skateboards (identification number 608 2RS). Bearing 108 comprises: outer ring 108a, inner ring 108b in a spaced relationship to outer ring 108a, and a number of rollers sized to fit between outer ring 108a and inner ring 108b (all items not shown in detail). The interior diameter of inner ring 108b is sized and shaped to accept, fit and hold the cross-section diameter of bit 106. As such, bit 106 is held tightly to inner ring 108b. Inner ring 108b and as such, bearing 108, may be press fit to bit 106 and/or may be welded or otherwise mechanically bonded to bit 106. Housing 110 is attached to bearing 108. As shown, for one embodiment, housing 110 is shaped to receive and hold outer ring 108a. Alternatively, housing 110 may be shaped differently and still be attached to outer ring 108a or may be integrally attached to outer ring 108a. As such, with bearing 108 fitted to bit 106, bit holder 104 may be rotated about bit 106. For an embodiment, bearing 108 has an inner diameter of inner ring 108b of approximately 8 mm, an outer external diameter of outer ring 108a of approximately 22 mm and a thickness of approximately 7 mm. The inner diameter of inner ring 108b is sized to snugly accept a bit having approximately a 5/16 inch diameter. It will be seen that the interior shape of inner ring 108b may be shaped to accept one or more cross-section shapes of different bits (e.g. the interior shape may be circular, square, hexagonal, etc.).

Housing 110 may be attached to clip 114 via cable 112. Aperture 116 in housing 110 provides a location to fasten one end of cable 112. The other end of cable 112 may be fashioned in a loop which may be connected to connector 120, which itself may be considered to be a part of clip 114. In the embodiment shown, connector 120 is a carabiner. In other embodiments, connector 120 may be a split key ring, a binder ring or other fastening device, which may or may not be integrated with clip 114. Alternatively, cable 112 may be connected directly to clip 114 without connector 120. Clip 114 may be mounted on tool 102. Per FIG. 1, multiple bit holders 104, 104b with each with different bits 106 may be connected to clip 114 through additional cables 112 and connectors 120, providing a system of holders 104 connected to clip 114 and thereby in one embodiment, connected to tool 102. In other embodiments, clip 114 may be not on tool 102, and may be presented like a separate "key ring" of bits. Cable 112 may be made of metal, plastic, string, cord or other suitable tensile material. It will be appreciated that other embodiments may provide different system and components to connect holder 104 to clip 114, for example through various connectors, lanyards, chains, strings, links, wires, rings, etc. The term "cable" as used herein globally includes such other connectors. The cable may be retractable into a cable housing.

In use, when bit 106 with holder 104 is mounted to tool 102 and tool 102 is activated, bit 106 will spin about its main rotational axis. Through residual friction between bearing 108, bit 106 and holder 104, when tool 102 is activated, housing 110 may rotate loosely in the same rotational direction, and as it rotates, slack in cable 112 will be taken up. Eventually, slack in cable 112 will be taken up and holder 104 will be restrained by cable 112 from rotating with bit 106. However, bearing 108 will still allow bit 106 to rotate about its axis, but housing 110 will not rotate.

When a different bit is required for tool 102, bit 106 can be removed from tool 102 (e.g. by loosening the chuck of tool 102 and removing bit 106 from the chuck). If bit 106 is then "dropped" from tool 102, as bit 106 is still attached to holder 104 and cable 112, bit 106 will fall from the chuck of tool 102, but will still be attached to tool 102 via clip 114, thereby facilitating quick retrieval and reuse of bit 102. After bit 106 is removed from tool 102, a second bit 102 with its holder 104 and cable 112 may be inserted into tool 102. A label (e.g. "5/16 driver", FIG. 1), text, marker, identifier, visual indicator (e.g. colour), or physical indicator (e.g. a distinguishing protrusion) may be painted, printed, embossed, etched, stamped or otherwise provided on a given housing 110 (or its cable 112) to readily identify its bit contained to assist in distinguishing it from other bits. The term "label" as used herein globally includes such identifiers.

Cable attachment housing 110 may be formed from any suitable rigid material such as thermoplastic or metal (e.g. aluminum). Housing 110 may be any shape and dimension suitable to snugly and tightly hold bearing 108 and provide an attachment location, such as aperture 116 for cable 112 or an intermediary ring 118 connecting cable 112 to aperture 116. In one embodiment as shown, housing 110 is cam-shaped with a protruding part to locate aperture 116. In an embodiment, housing 110 has a main diameter of approximately 1.2 inches and a thickness of approximately 0.25 inches. Aperture 116 is located in the protruding part and has a diameter of approximately 0.25 inches. In an embodiment, housing 110 is a separate piece from bearing 108 and bearing 108 is press fitted into housing 110. In other embodiments, cable attachment housing 110 may be integrally formed as part of the outer ring or outer feature of a bearing. In still other embodiments, a cable attachment housing may be provided as a protrusion attached to, or integrated on a bearing (akin to the protrusion shown in housing 110) with an aperture provided therein. The term "housing" as used herein is shaped to provide an aperture (like aperture 116) to receive a cable (like cable 112) and is attached to, and/or is integrated with, a bearing that is attached to a bit. Intermediary ring 118 may be a split ring of metal and may provide a break-point mechanism for cable 112 from housing 110 if bearing 108 seizes and housing 110 rotates with bit 104 in tool 102. A comparable break-point mechanism can be provided within housing 110, cable 112 and/or clip 114 (e.g. through a spring-release mechanism, a predetermined mechanical failure point, etc.).

While cable(s) 112/connectors 120 for holder(s) 104 are shown to be attached to tool 102, each cable 112/connector 120 may be attached to other features or items separate from tool 102.

In another embodiment, housing 110 may be integrated with bearing 108 and bit 106.

In another embodiments, tool 102 may be a hand tool, such as a multi-bit screwdriver, a power impact gun, a ratchet, a grinder, a power screw guns, an impact screw gun, a hammer drill, magnetic drills, a stationary machine such as a milling machine or a drill press or other tools.

It will be appreciated that each component of each embodiment may be made from any suitable material providing sufficient rigidity and durability to perform the functions described herein (such as various metals, alloys, steel, aluminum, brass, plastics, etc. in various compositions) as is known to persons in the art.

It will be appreciated that features describing aspects of embodiments as being "mountable", "attachable", "vertical", "parallel", "aligned" or in other terms relating to relative position or orientation have a range of acceptable implementations, values or positions that, if provided, still provide a functional embodiment. For example, a component described as being "mountable" will have suitable physical shape(s) and dimension(s) enabling it to be mounted with its intended mate; a component described as being "attachable" will be attachable to its intended mate via a mechanical friction fit and/or an additional bond (e.g. adhesive or weld); and a component described as having "vertical" or "parallel" element(s) will encompass elements that are substantially vertical or parallel. As a further example, if two components are described as being "parallel" in orientation, other embodiments will tolerate the two components being aligned in a nearly parallel fashion (where the description may use the term "generally parallel"). Similarly, if a component is described as being "aligned", other embodiments will tolerate a component being nearly aligned. It will be plainly obvious to a person of skill in the art as to what range of values would be acceptable.

In this disclosure, where a threshold or dimension is provided as an approximate value (for example, when a dimension or threshold is qualified with the term "approximately"), a range of values will be understood to be valid for that value. For example, for a dimension stated as an approximate value, a range of about 25% larger and 25% smaller than the stated value may be used. Thresholds, values, measurements, and dimensions of features are illustrative of embodiments and are not limiting unless noted. Further, a "sufficient" designation (e.g. a sufficient size) may mean having dimensions or values that provide a minimum amount of material or size to achieve a stated function of the related parameter.

In this disclosure, where the conjunction "and/or" is used to end a list of elements, it will be understood that its use indicates an "inclusive or" of the listed elements. As such, the phrase "X and/or Y" means "(X or Y) or (both X and Y)".

Although this disclosure describes embodiments where the apparatus are used to hold a bit of a tool, it will be appreciated that other embodiments may be provided for holding any mountable part to a machine, where such mountable parts would otherwise be loose and prone to loss.

Although the disclosure has been described with reference to certain specific embodiments, various modifications thereof will be apparent to those skilled in the art without departing from the scope of the disclosure as outlined in the claims appended hereto.

The invention claimed is:

1. A holder for a bit for a tool, the holder comprising:
a bearing shaped to securely hold the bit; and
a housing attached to the bearing and to a clip, wherein
when the housing is attached to the clip, the bit can be mounted to the tool and the tool can be operated to rotate the bit; and
when the bit is removed from the tool, the bit is still attached to the housing which is still attached to the clip.

2. The holder for a bit for a tool as claimed in claim 1, wherein:
an inner ring of the bearing is shaped and sized to provide a friction fit to securely hold the bit.

3. The holder for a bit for a tool as claimed in claim 2, wherein:
the housing is attached to an outer ring of the bearing.

4. The holder for a bit for a tool as claimed in claim wherein:
the housing is shaped and sized to provide a friction fit to securely hold the outer ring.

5. The holder for a bit for a tool as claimed in claim 4, wherein:
a cable attaches the housing to the clip.

6. The holder for a bit for a tool as claimed in claim 5, wherein:
the cable is retractable into a cable housing.

7. The holder for a bit for a tool as claimed in claim 5, wherein:
the clip further comprises a connector to attach the cable to the clip.

8. The holder for a bit for a tool as claimed in claim 5, wherein:
the clip is attached to the tool.

9. The holder for a bit for a tool as claimed in claim 5, wherein:
the clip is separate from the tool.

10. The holder for a bit for a tool as claimed in claim 4, wherein:
a ring attaches the housing to a cable attachable to the clip, the ring providing a break mechanism for the cable from the housing.

11. The holder for a bit for a tool as claimed in claim 1, further comprising:
an identifier provided on either the housing or a cable attachable to the clip that identifies the bit.

12. A set of holders for bits for a tool, the set comprising:
a first holder for a first bit;
a second holder for a second bit; and
a clip, wherein
each of the first and second holders comprises
a bearing shaped to securely hold its bit, and
a housing attached to the bearing;
each housing is attachable to the clip; and
when each housing is attached to the clip,
its bit can be mounted to the tool,
the tool can be operated to rotate its bit, and
when its bit is removed from the tool, its bit is still attached to the housing which is still attached to the clip.

13. The set of holders for bits for a tool as claimed in claim 12, wherein:
each holder has an identifier provided on either the housing or a cable attachable to the clip that identifies its bit.

14. The set of holders for bits for a tool as claimed in claim 12, wherein:
each bearing has an inner ring of the bearing shaped and sized to provide a friction fit to securely hold its bit.

15. The set of holders for bits for a tool as claimed in claim 14, wherein each housing:
is attached to the clip by a cable.

16. The set of holders for bits for a tool as claimed in claim 15, wherein the clip further comprises:
a connector to attach the cable to the clip.

17. The set of holders for bits for a tool as claimed in claim 16, wherein:
the clip is attached to the tool.

18. A holder for bits for a tool, comprising:
a bit shaped to be mounted to the tool;
a bearing shaped to securely hold the bit, the bearing having an inner ring and an outer ring;
a housing attached to the outer ring of the bearing;
a wire attached to the housing; and
a clip attachable to the wire, wherein
when the wire is attached to the clip, the bit can be mounted to the tool and tool can be operated to rotate the bit; and
when the bit is removed from the tool, the bit is still attached to the housing which is still attached to the clip.

19. The holder for bits for a tool as claimed in claim 18, further comprising:
an identifier provided on either the housing or a cable attachable to the clip that identifies the bit.

20. The holder for bits for a tool as claimed in claim 19, wherein:
the housing is shaped and sized to provide a friction fit to securely hold an outer ring of the bearing.

* * * * *